United States Patent
Yamaguchi

(10) Patent No.: US 7,031,595 B2
(45) Date of Patent: Apr. 18, 2006

(54) DISK REPRODUCING APPARATUS

(75) Inventor: Takahiro Yamaguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1124 days.

(21) Appl. No.: 09/905,882

(22) Filed: Jul. 17, 2001

(65) Prior Publication Data

US 2002/0018641 A1 Feb. 14, 2002

(30) Foreign Application Priority Data

Jul. 24, 2000 (JP) ............... P 2000-222835

(51) Int. Cl.
*H04N 5/91* (2006.01)
(52) U.S. Cl. ........................................ 386/68
(58) Field of Classification Search .............. 386/68
See application file for complete search history.

(56) References Cited

U.S. PATENT DOCUMENTS 6,510,554 B1 * 1/2003 Gordon et al. ............... 725/90
6,728,469 B1 * 4/2004 Okazaki et al. ............... 386/68
2005/0094974 A1 * 5/2005 Nagasawa ..................... 386/95

FOREIGN PATENT DOCUMENTS

JP  11-288580  10/1999

* cited by examiner

*Primary Examiner*—James J. Groody
*Assistant Examiner*—Heather R. Jones
(74) *Attorney, Agent, or Firm*—Morgan Lewis & Bockius LLP

(57) ABSTRACT

A disc reproducing apparatus which reproduces images recorded on an optical disc has: scene detecting means for detecting scenes with judging, as a leading frame of a scene, a frame which is abnormally biased to one of future and past time directions of predictive coding of B-pictures; scene reproduction controlling means for, each time when a predetermined time period which is preset elapses, reproducing images of the scenes which are detected by the scene detecting means, for a predetermined time period which is preset; and timer controlling means for measuring and controlling the time periods.

12 Claims, 3 Drawing Sheets

DISK REPRODUCING APPARATUS

BACKGROUND OF THE INVENTION

1. Technical Field

The present invention relates to a disc reproducing apparatus which reproduces images or the like recorded on an optical disc such as a digital video disc (DVD), and more particularly to fast forward reproduction or reverse reproduction in a unit of scene in which images recorded on an optical disc are sequentially reproduced.

2. Related Art

In the conventional art, a disc reproducing apparatus is disclosed in the Unexamined Japanese Patent Application Publication No. Hei11-288580. In the disclosed apparatus, image data recorded on an optical disc such as a DVD are searched to find out a desired image, and the image is reproduced. In order to perform this, search addresses of plural video titles recorded in a management information area of the optical disc are referred, and only a part of images of the respective recorded video titles is reproduced by intro-reproduction in a unit of title or chapter so that images of the video titles can be checked.

[Problem to be Solved]

In the conventional disc reproducing apparatus, record contents of frames of predetermined intervals are reproduced in a unit of title or chapter. Therefore, a search for an image of a scene which is intended to be seen is influenced by the length of the image of the scene, and the image cannot be efficiently reproduced. Specifically, in the conventional disc reproducing apparatus, when fast forward reproduction or reverse reproduction is performed, images recorded on an optical disc are sequentially reproduced in a unit of title or chapter. Therefore, images cannot be sequentially reproduced in a unit of scene and without being restricted by a title or a chapter. Consequently, it is impossible to find a scene of images recorded on the optical disc and reproduce images of the scene.

The case where images recorded on an optical disc are searched to find out an image of a desired scene will be considered. With respect to a scene which is longer than one frame, frames in which images of the scene are recorded are sequentially skippingly reproduced, so that images of the same scene contents are intermittently displayed. As a result, there arises a disadvantage that a long time period is required for finding the next scene and hence the search cannot be efficiently performed. A scene which is shorter than one frame is skippingly reproduced in an interleaved manner. Therefore, there is another disadvantage that images of such a short scene are jumped over and hence not reproduced. When images of a scene which is shorter than one frame are reproduced, images of the subsequent scene are reproduced only for the remaining time period of one frame, thereby producing a further disadvantage that the contents of the scene are hardly understood. FIG. 4 diagrammatically shows the above-mentioned operation in fast forward reproduction or reverse reproduction in the conventional art example.

SUMMARY OF THE INVENTION

The invention has been conducted in view of the problems. It is an object of the invention to, when images recorded on an optical disc such as a DVD are subjected to fast forward reproduction or reverse reproduction in a unit of scene, sequentially reproduce leading frames of scenes at predetermined time intervals for a time period corresponding to one frame or the length of the images of the scene, thereby enabling an image of a desired scene to be efficiently found out.

[Means for Solving the Problems]

In order to attain the object, according to the invention, a disc reproducing apparatus which reproduces images recorded on an optical disc such as a DVD comprises: scene detecting means for detecting scenes with judging, as a leading frame of a scene, a frame which is abnormally biased to one of future and past time directions of predictive coding of bidirectional coded pictures (B-pictures); scene reproduction controlling means for, each time when a predetermined time period which is preset elapses, reproducing images of the scenes which are detected by said scene detecting means, for a predetermined time period which is preset; and timer controlling means for measuring and controlling the time periods.

By these means, images recorded on an optical disc such as a DVD can be subjected to fast forward reproduction or reverse reproduction in a unit of scene at predetermined time intervals. Therefore, an image of a scene which the user wishes to see can be found out efficiently and rapidly. Even a scene which is shorter than one frame can be searched out more efficiently than the case where such a scene is searched by conventional fast forward reproduction or reverse reproduction.

BRIEF DESCRIPTION OF THE DRAWINGS

FIG. 1 is a block diagram showing the configuration of a disc reproducing apparatus which is an embodiment of the invention.

FIG. 2 is a flowchart showing the operation of the disc reproducing apparatus of the embodiment of the invention.

FIG. 3 is a diagram showing the operation of fast forward reproduction or reverse reproduction in a unit of scene in the embodiment of the invention.

FIG. 4 is a diagram showing the operation of fast forward reproduction or reverse reproduction in a conventional art example.

DETAILED DESCRIPTION OF THE PREFERRED EMBODIMENTS

[Mode for Carrying Out the Invention]

Figure 1:
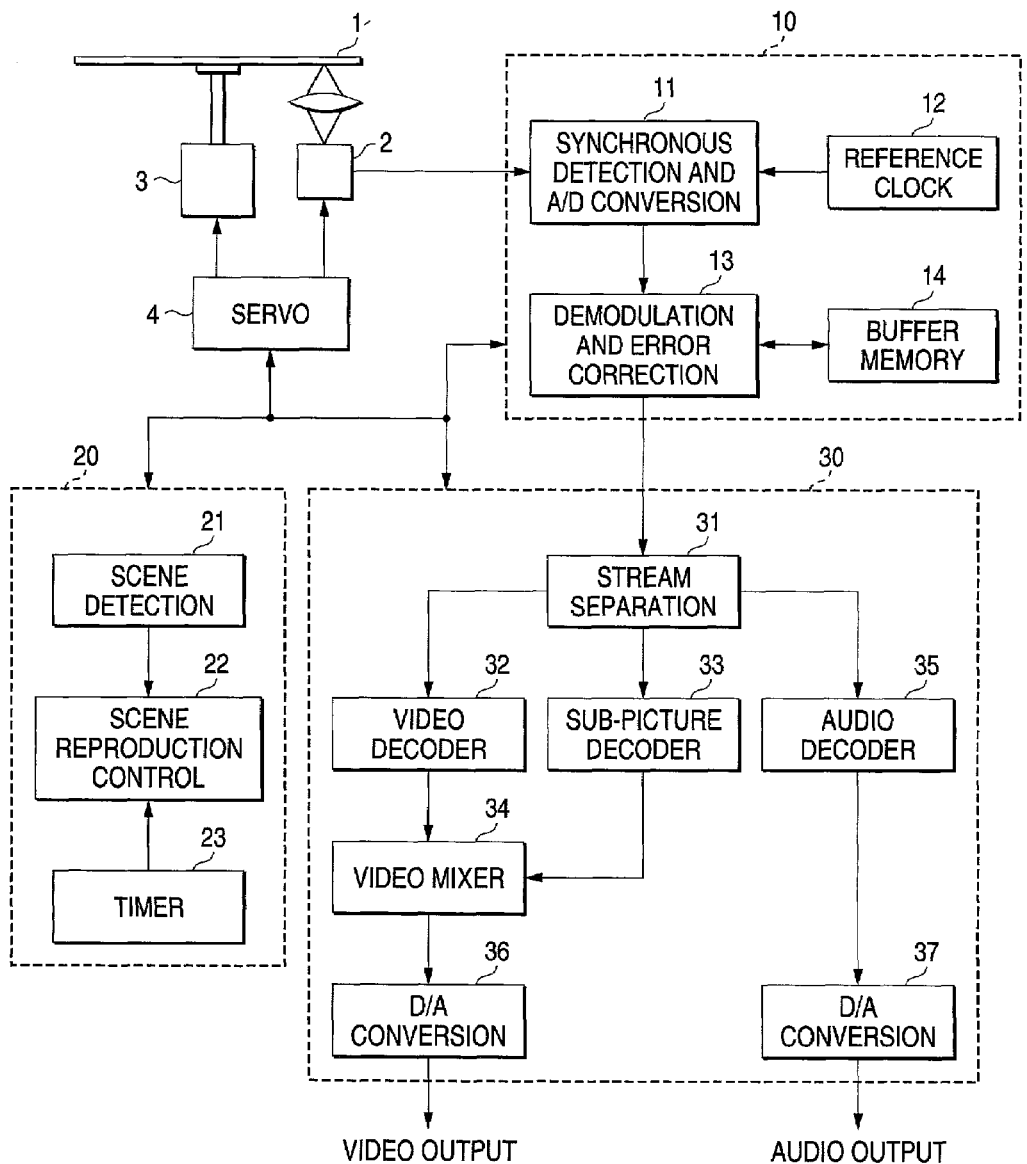
[FIG. 1]
Figure 2:
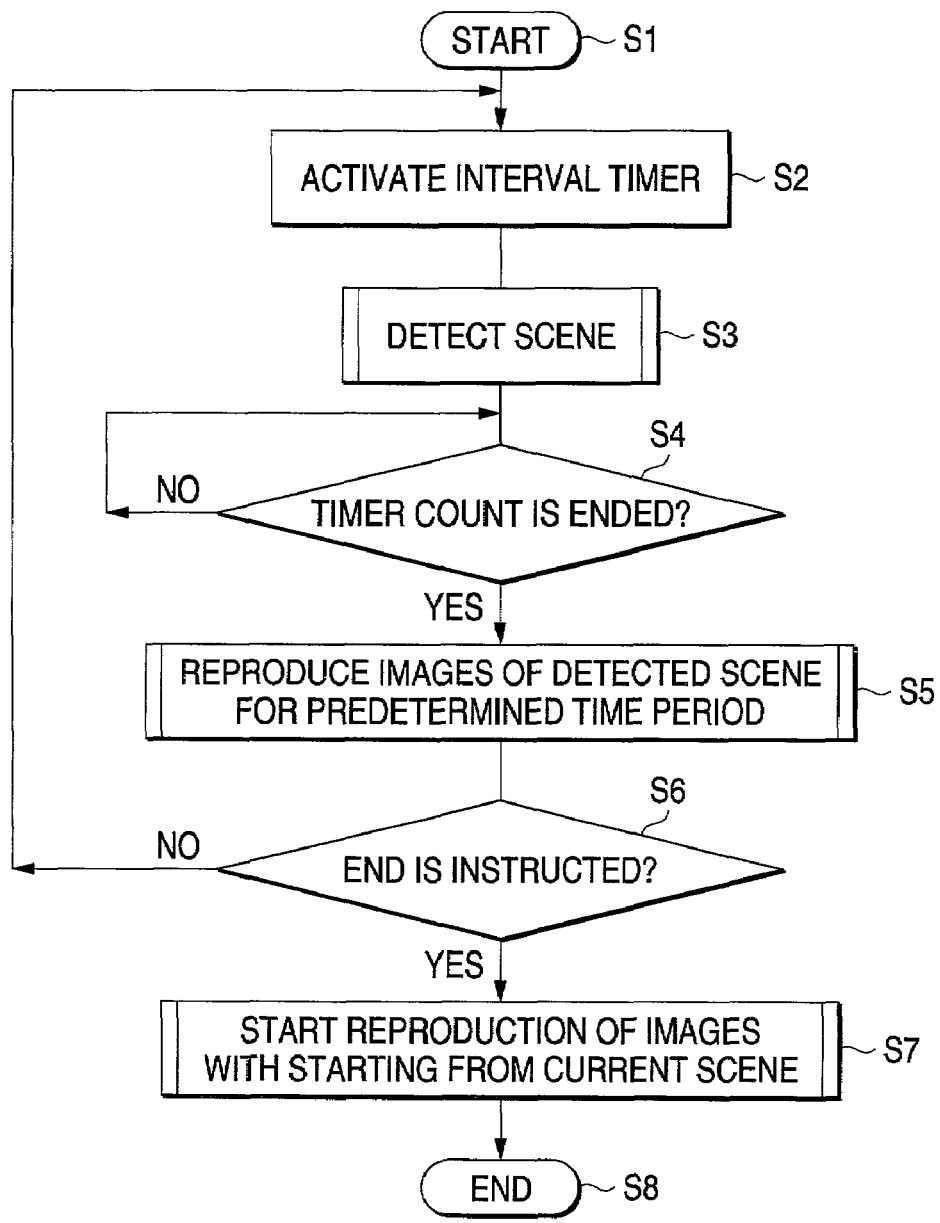
[FIG. 2]
Figure 3:
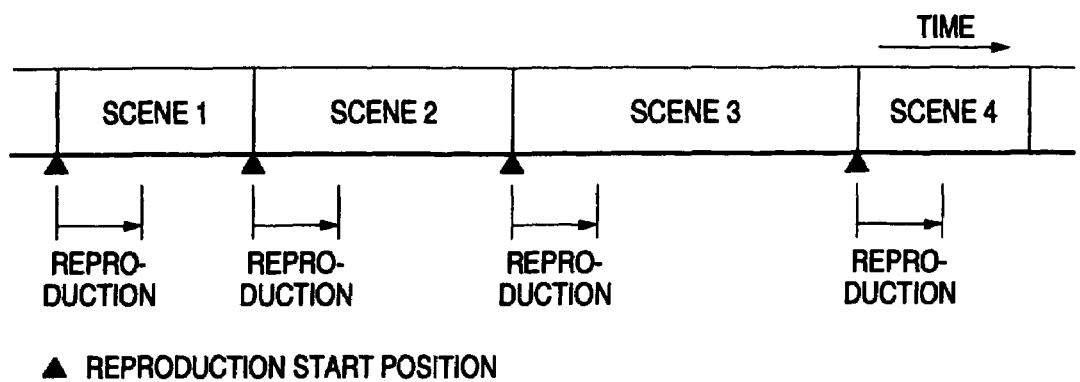
[FIG. 3]
Figure 4:
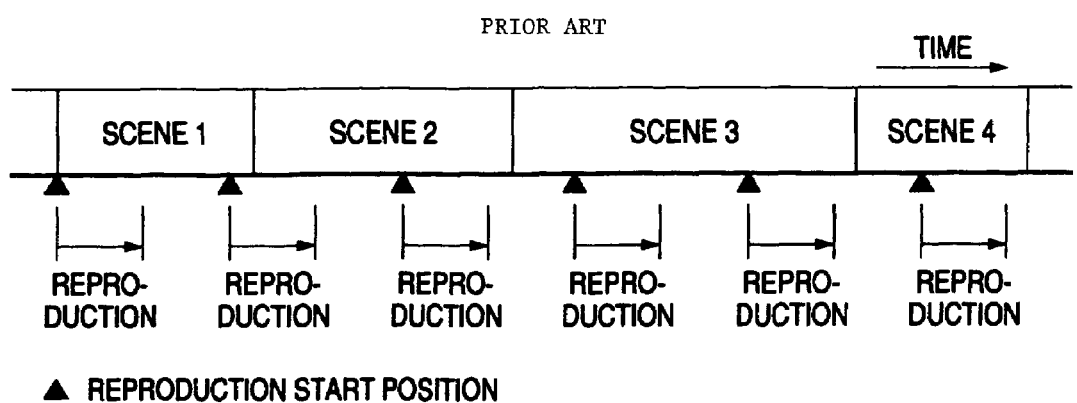
[FIG. 4]

Hereinafter, an embodiment of the invention will be described in detail with reference to the accompanying drawings. FIG. 1 is a block diagram showing the configuration of a disc reproducing apparatus which is an embodiment of the invention, FIG. 2 is a flowchart showing the operation of the disc reproducing apparatus of the embodiment of the invention, and FIG. 3 is a diagram showing the operation of fast forward reproduction or reverse reproduction in a unit of scene in the embodiment of the invention.

First, the configuration of the disc reproducing apparatus of the embodiment of the invention will be described with reference to the block diagram of FIG. 1.

Image data recorded on an optical disc 1 such as a DVD are optically read by an optical pickup 2. The optical disc 1 is rotated by a spindle motor 3, and the rotation is controlled in a spindle servo control by a servo circuit 4. The optical pickup 2 is focus-controlled and tracking-controlled in a focus servo control and a pickup servo control by the servo circuit 4.

A signal of the image data which have been read by the optical pickup 2 and are recorded on the optical disc 1 (hereinafter, such a signal is referred to as an image signal) is sent to a data process section 10 to be amplified. The amplified signal is subjected to synchronous detection on the basis of a reference clock signal from a reference clock circuit 12, and converted from an analog signal to a digital signal by a synchronous detection and A/D (analog to digital) conversion circuit 11. In a demodulation and error correction circuit 13, the converted digital image signal is demodulated, and an error of the read-out data is corrected. A buffer memory 14 is used for temporarily storing the image signal read out from the optical disc 1 in order to perform error correction on the image signal.

The image signal which has undergone the error correction in the error correction circuit 13 is sent to a stream separation circuit 31 of a decoder section 30. A video signal, a sub-picture signal, and an audio signal are separated from the image signal by the stream separation circuit 31, and then sent respectively to a video decoder 32, a sub-picture decoder 33, and an audio decoder 35 to be decoded. In the video decoder 32, I (intra-coded) pictures configured by a bundle of pixels, P (predictive coded) pictures which are produced by performing prediction with adding temporal change information such as motion information to the I-pictures, and B (bidirectional coded) pictures which are similarly produced with prediction from pictures in forward and rearward directions are reproduced and reorganized to return the image data to the original video signal. The video signal which is decoded in the video decoder 32, and the sub-picture signal which is demodulated in the sub-picture decoder 33 are combined with each other by a video mixer 34. The video signal synthesized in the video mixer 34 is coded into a video signal of a predetermined signal system such as the NTSC (national television system committee) system, converted from a digital signal to an analog signal by a D/A (digital to analog) conversion circuit 36, and then output as a video signal. The audio signal which is decoded in the audio decoder 35 is converted from a digital signal to an analog signal by a D/A conversion circuit 37, and then output as an audio signal.

In the image signal which has undergone the error correction in the error correction circuit 13, various controls signals for controlling the whole system, and the I-pictures, the P-pictures, and the B-pictures which are reproduced by the video decoder 32 are supplied to a control section 20 which controls the whole system. The control section 20 receives a signal due to a key input or a remote control input, and transmits and receives control signals such as a read instruction to and from the servo circuit 4, the data process section 10, and the decoder section 30 in order to control the whole system. The control section 20 has various control functions for reproducing an image signal recorded on an optical disc. However, only principal portions relating to the invention are shown in the figure.

B-pictures are changed in accordance with the speed and complexity of motion of images. Scene detecting means 21 detects scenes by searching for a frame which is abnormally biased to the future or past time direction of predictive coding of the B-pictures. Images of the scenes which are detected by the scene detecting means 21 are controlled by scene reproduction controlling means 22 so as to, each time when a predetermined time period which is preset elapses, be reproduced for a predetermined time period which is preset. These time periods are measured and controlled by timer controlling means 23.

Fast forward reproduction or reverse reproduction in a unit of scene is started by selectively determining one of fast forward reproduction and reverse reproduction in a unit of scene by means of a key input or a remote control input conducted by the user during a period when images recorded on an optical disc such as a DVD are being reproduced. When fast forward reproduction or reverse reproduction in a unit of scene is selectively determined during reproduction of images, the scene detecting means 21 starts an operation of searching for a frame which is abnormally biased to the future or past time direction of predictive coding of the B-pictures, and detects the leading frame of a scene. Thereafter, fast forward reproduction or reverse reproduction in a unit of scene is performed. Each time when the predetermined time period which is preset elapses, images of respective scenes are reproduced by fast forward reproduction or reverse reproduction in a unit of scene for the predetermined time period which is preset. FIG. 3 diagrammatically shows the above-mentioned operations in fast forward reproduction or reverse reproduction in a unit of scene in the embodiment of the invention.

During fast forward reproduction or reverse reproduction in a unit of scene, scenes of images recorded on the optical disc are sequentially detected and reproduction of images of each of the scenes is repeated until an instruction for stopping fast forward reproduction or reverse reproduction in a unit of scene is given.

When the user finds a desired scene, the user again conducts a key operation for fast forward reproduction or reverse reproduction in a unit of scene, or that for reproduction during fast forward reproduction or reverse reproduction in a unit of scene, whereby fast forward reproduction or reverse reproduction in a unit of scene is stopped. The operation of reproducing images of a scene during fast forward reproduction or reverse reproduction in a unit of scene is transferred to the usual reproduction, so that image reproduction can be continued.

When fast forward reproduction or reverse reproduction in a unit of scene is stopped, the usual reproduction may be started from the leading frame of the scene of the image which is being reproduced. During fast forward reproduction or reverse reproduction in a unit of scene, information such as the number of the title or the chapter which is being reproduced may be displayed on a display section. According to this configuration, the user can designate the title number or the chapter number relating to the scene of the image which the user wish to see, and the image can be seen while reproduction is started from the leading frame of the image of the title or the chapter.

Next, the operation of the disc reproducing apparatus of the embodiment of the invention will be described with reference to the flowchart of FIG. 2.

When start of fast forward reproduction or reverse reproduction in a unit of scene is selectively determined and instructed during reproduction of images of a DVD, the control proceeds from step S1 to step S2 to activate an interval timer for measuring the time interval, and then proceeds to step S3.

In step S3, a frame which is abnormally biased to one of future and past time directions of predictive coding of B-pictures that are produced with prediction from pictures in forward and rearward directions is searched to detect the leading frame of a scene.

It is judged in step S4 whether the interval timer is ended or not. If the interval timer is not ended, the control returns to step S4. If the interval timer is ended, the control advances to step S5.

In step S5, images of the detected scene are reproduced for the predetermined time period. The time period during which the images are reproduced in fast forward reproduction or reverse reproduction in a unit of scene may be set to a time period corresponding to one frame of the leading frame for each scene or the length of the scene.

It is judged in step S6 whether ending of fast forward reproduction or reverse reproduction in a unit of scene is instructed or not. If ending is instructed, the control proceeds to step S7. If ending is not instructed, the control returns to step S2, and the processes of steps S2 to S6 are repeated so that images are sequentially subjected to forward reproduction or reverse reproduction in a unit of scene.

In step S7, usual reproduction of images is started from the current scene, and forward reproduction or reverse reproduction in a unit of scene is ended.

[Effects of the Invention]

As described above, according to the disc reproducing apparatus of the invention, scenes of images recorded on an optical disc can be detected, and images of the detected scenes can be displayed by performing forward reproduction or reverse reproduction in a unit of scene. As a result, the user can find out more efficiently and rapidly a scene of images recorded on the optical disc which the user wishes to see. Also a scene which is shorter than one frame can be found out more efficiently than the case where such a scene is searched by conventional fast forward reproduction or reverse reproduction.

In the disc reproducing apparatus of the first aspect of the invention, scenes are detected with judging, as a leading frame of a scene, a frame which is abnormally biased to one of future and past time directions of predictive coding of bidirectional coded pictures that are produced with prediction from pictures in forward and rearward directions, and images of the respective scenes are reproduced. Therefore, a scene which is to be found can be searched more efficiently from the images that are sequentially displayed for each scene.

In the disc reproducing apparatus of the second aspect of the invention, when detected scenes are to be subjected to fast forward reproduction or reverse reproduction in a unit of scene, leading frames of the scenes are sequentially reproduced. Therefore, images of leading portions of scenes are sequentially displayed, so that a scene which is to be found can be searched efficiently.

In the disc reproducing apparatus of the third aspect of the invention, when detected scenes are to be subjected to fast forward reproduction or reverse reproduction in a unit of scene, images of the scenes are sequentially reproduced for the length of the images of the respective scenes. Therefore, the contents of the images of the scenes can be easily understood, so that the contents of the images of the scenes can be easily understood and a scene which is to be found can be searched more efficiently from the images that are sequentially displayed.

In the disc reproducing apparatus of the fourth aspect of the invention, when detected scenes are to be subjected to fast forward reproduction or reverse reproduction in a unit of scene, images of one of the scenes are reproduced, and those of the next scene are then reproduced. Therefore, the images of the scenes can be efficiently reproduced one after another.

In the disc reproducing apparatus of the fifth aspect of the invention, when the fast forward reproduction or reverse reproduction in a unit of scene is stopped, reproduction is then performed with starting from the scene which is being reproduced. Therefore, the images which are being reproduced by fast forward reproduction or reverse reproduction in a unit of scene can be successively seen in usual reproduction.

In the disc reproducing apparatus of the sixth aspect of the invention, when the fast forward reproduction or reverse reproduction in a unit of scene is stopped, reproduction is then performed with starting from the leading frame of the scene which is being reproduced. Therefore, the scene of the image which is found out can be seen with being reproduced from the beginning.

What is claimed is:

1. A disc reproducing apparatus for reproducing images recorded on an optical disc, comprising:
    scene detecting means for detecting scenes with judging, as a leading frame of a scene, a frame which is abnormally biased to one of future and past time directions of predictive coding of bidirectional coded pictures that are produced with prediction from pictures in forward and rearward directions;
    scene reproduction controlling means for, each time when a first predetermined time period which is preset elapses, reproducing images of the scenes which are detected by said scene detecting means, for a second predetermined time period which is preset; and
    timer controlling means for measuring and controlling the time periods, wherein
    images of the respective scenes detected by said scene detecting means are sequentially subjected to fast forward reproduction or reverse reproduction in a unit of scene.

2. The disc reproducing apparatus according to claim 1, wherein
    said second predetermined time period is a time period for reproducing the leading frame of images of a scene.

3. The disc reproducing apparatus according to claim 1, wherein
    said second predetermined time period is a time period for reproducing a length of images of a scene.

4. The disc reproducing apparatus according to claim 1, wherein
    said first predetermined time period is equal to said second predetermined time period.

5. The disc reproducing apparatus according to claim 1, wherein
    when the fast forward reproduction or reverse reproduction in a unit of scene is stopped, reproduction is then performed with starting from an image of a scene which is being reproduced.

6. The disc reproducing apparatus according to claim 1, wherein
    when the fast forward reproduction or reverse reproduction in a unit of scene is stopped, reproduction is then performed with starting from a leading frame of a scene which is being reproduced.

7. A disc reproducing apparatus for reproducing images recorded on an optical disc, comprising:
    scene detecting member for detecting scenes with judging, as a leading frame of a scene, a frame which is abnormally biased to one of future and past time directions of predictive coding of bidirectional coded pictures that are produced with prediction from pictures in forward and rearward directions;

scene reproduction controlling member for, each time when a first predetermined time period which is preset elapses, reproducing images of the scenes which are detected by said scene detecting member, for a second predetermined time period which is preset; and timer controlling member for measuring and controlling the time periods, wherein images of the respective scenes detected by said scene detecting member are sequentially subjected to fast forward reproduction or reverse reproduction in a unit of scene.

8. The disc reproducing apparatus according to claim 7, wherein said second predetermined time period is a time period for reproducing the leading frame of images of a scene.

9. The disc reproducing apparatus according to claim 7, wherein said second predetermined time period is a time period for reproducing a length of images of a scene.

10. The disc reproducing apparatus according to claim 7, wherein said first predetermined time period is equal to said second predetermined time period.

11. The disc reproducing apparatus according to claim 7, wherein when the fast forward reproduction or reverse reproduction in a unit of scene is stopped, reproduction is then performed with starting from an image of a scene which is being reproduced.

12. The disc reproducing apparatus according to claim 7, wherein when the fast forward reproduction or reverse reproduction in a unit of scene is stopped, reproduction is then performed with starting from a leading frame of a scene which is being reproduced.

* * * * *